(12) United States Patent
James, Jr.

(10) Patent No.: US 11,932,161 B2
(45) Date of Patent: Mar. 19, 2024

(54) DETACHABLE TIE DOWN

(71) Applicant: Lewis William James, Jr., Paso Robles, CA (US)

(72) Inventor: Lewis William James, Jr., Paso Robles, CA (US)

( * ) Notice: Subject to any disclaimer, the term of this patent is extended or adjusted under 35 U.S.C. 154(b) by 0 days.

(21) Appl. No.: 17/505,143

(22) Filed: Oct. 19, 2021

(65) Prior Publication Data
US 2023/0073434 A1  Mar. 9, 2023

Related U.S. Application Data

(63) Continuation of application No. 16/718,582, filed on Dec. 18, 2019, now Pat. No. 11,167,684.

(60) Provisional application No. 62/782,983, filed on Dec. 20, 2018.

(51) Int. Cl.
*B60P 7/06* (2006.01)
*B60P 7/08* (2006.01)

(52) U.S. Cl.
CPC ........... *B60P 7/0807* (2013.01); *B60P 7/065* (2013.01); *B60P 7/0823* (2013.01); *B60Y 2410/132* (2013.01)

(58) Field of Classification Search
CPC ....... B60P 7/0807; B60P 7/065; B60P 7/0823; B60P 7/12; B60P 7/06; B60Y 2410/132
USPC .................................................. 410/96, 106
See application file for complete search history.

(56) References Cited

U.S. PATENT DOCUMENTS

| | | | | |
|---|---|---|---|---|
| 1,639,563 A * | 8/1927 | Hays | ......................... | B60R 9/02 248/139 |
| 3,334,914 A * | 8/1967 | Vierregger | ............ | B60P 7/0807 410/106 |
| 3,960,091 A * | 6/1976 | Ehlert | .................... | B60P 7/0807 410/101 |
| 4,023,761 A * | 5/1977 | Molis | ...................... | F16B 2/065 248/316.4 |
| 4,630,990 A * | 12/1986 | Whiting | ................... | B60R 9/042 224/310 |
| 5,799,849 A * | 9/1998 | Beer | ....................... | B60R 11/00 224/403 |
| 6,273,654 B1 * | 8/2001 | Whitaker | .............. | B60P 7/0807 410/97 |
| 6,863,198 B1 * | 3/2005 | Darby | ....................... | B60R 7/02 224/570 |
| D666,897 S * | 9/2012 | Church | .......................... | D8/373 |
| 8,523,259 B2 * | 9/2013 | Dawe | ...................... | B60R 11/06 296/37.8 |
| 9,499,105 B1 * | 11/2016 | Long | ....................... | B60P 3/055 |
| 2005/0196259 A1 * | 9/2005 | Gilson | .................... | B60P 1/003 414/527 |

(Continued)

*Primary Examiner* — Hilary L Gutman
(74) *Attorney, Agent, or Firm* — Larry E. Henneman, Jr.; Henneman & Associates, PLC

(57) ABSTRACT

A novel securing device includes a frame having an anchor, a tether coupled to the anchor, and an attachment device coupled to the frame. The attachment device is configured to facilitate selective attachment to a planar surface. In a particular embodiment, the attachment device is a magnetic attachment device. Optionally, the magnetic attachment device is encased between the frame and a cover that prevents scratching of the planar surface to which the device is secured. In another particular embodiment, the attachment device is a suction cup. The magnetic attachment device and the suction cup may be interchangeable.

21 Claims, 11 Drawing Sheets

(56) References Cited

U.S. PATENT DOCUMENTS

| | | | |
|---|---|---|---|
| 2009/0267318 A1* | 10/2009 | Thoma | B60P 7/0807 |
| | | | 410/108 |
| 2015/0063961 A1* | 3/2015 | Cortese | B62B 1/14 |
| | | | 248/274.1 |
| 2016/0325669 A1* | 11/2016 | Byham | B60P 7/0807 |
| 2018/0147976 A1* | 5/2018 | Stojkovic | B62D 33/0273 |

* cited by examiner

DETACHABLE TIE DOWN

RELATED APPLICATIONS

This application is a continuation of U.S. application Ser. No. 16/718,582, filed on Dec. 18, 2019 by the same inventor, which claims the benefit of priority of U.S. Provisional Patent Application No. 62/782,983, filed on Dec. 20, 2018 by the same inventor, each of which is incorporated herein by reference in its entirety.

BACKGROUND OF THE INVENTION

Field of the Invention

This invention relates generally to fasteners, and more particularly to cargo securing devices.

Description of the Background Art

Cargo securing devices such as, for example, ratchet straps and cinch straps are widely used to secure cargo to structures of carrying vehicles (e.g., truck beds, trailers, trailer walls, etc.), or to safely secure objects to stationary structures (e.g., building walls, beams, etc.). Typically, such devices include hooks and/or loops that engage an anchor (e.g., eyelet, ring, etc.) of the carrying structure. One challenge with traditional cargo securing devices is that there must be an available anchor on the structure for the cargo securing device to engage.

What is needed, therefore, is a securing device capable of being attached to surfaces that do not have existing anchors.

SUMMARY

The present invention overcomes the problems associated with the prior art by providing a securing device capable of being attached to surfaces that do not have existing anchors and/or surfaces to which it is undesirable to affix permanent anchors. The invention facilitates the securing of cargo to surfaces including, but not limited to, flat surfaces and/or ferrous surfaces.

An example cargo securing device includes a frame, a tether, and an attachment device. The frame includes an anchor, and the tether is coupled to the anchor of the frame. The tether is configured to be removably attached to an object to be secured. The attachment device is coupled to the frame, and is configured to be removably attached directly to a planar surface.

In a particular example embodiment, the anchor includes at least a first aperture formed through the frame. The tether is disposed through the first aperture, and the first aperture is configured to position the tether to extend in a first direction. The example securing device can also include a second tether configured to be removably attached to an object. The anchor can include at least a second aperture formed through the frame, and the second tether can be disposed through the second aperture. The second aperture can be configured to position the tether to extend in a second direction, and, in a particular example embodiment, the first direction is perpendicular to the second direction.

In a more detailed example securing device, the anchor includes a third aperture formed through the frame, and the third aperture is aligned with the first aperture. The tether is disposed through the first aperture and the third aperture. The anchor also includes a fourth aperture formed through the frame, and the fourth aperture is aligned with the second aperture. The second tether is disposed through the second aperture and the fourth aperture. A portion of the tether extending between the first and third apertures is perpendicular to a portion of the second tether extending between the second and fourth apertures.

In an example configuration, the tether includes a first portion (e.g., one end), a second portion (e.g., an opposite end), and an intermediate portion (e.g., the middle) disposed between the first portion and the second portion. The intermediate portion of the tether is coupled to the anchor. The tether additionally includes a coupler configured to removably attach the first portion of the tether to the second portion of the tether. In a particular example securing device, the tether is a strap, and the coupler is a buckle. The buckle has a first portion attached to the first portion of the tether and a complimentary second portion attached to the second portion of the tether. The position of the first portion of the coupler along the first portion of the tether is adjustable. In addition, the tether is movable with respect to the anchor of the frame (e.g., slides freely through apertures of the anchor) when the tether is coupled to the anchor of the frame.

In an example securing device, wherein the attachment device includes a first magnet. The attachment device can further include a ferrous shell, which is configured to increase the pulling force of the magnet. The attachment device can optionally include a second magnet. For example, in an example magnetic attachment device, the first magnet is annular and defines an interior space, and the second magnet is disposed in the interior space of the first magnet. The second magnet can be in coaxial and/or coplanar alignment with the first magnet.

A particular example securing device additionally includes a cover disposed over the first magnet to prevent the magnet from scratching the planar surface to which the securing device is magnetically attached. The cover can be formed out of a material that is softer than the first magnet.

An example cover includes a first side and a second side opposite the first side. The first side is configured to abut the planar surface, and the second side defines a recess configured to receive the first magnet. In a particular embodiment, the first magnet is disposed between the frame and the cover. In addition, at least a portion of the cover is disposed between the first magnet and the frame.

An example frame includes a first side and an opposite second side. The tether can be coupled to the first side of the frame, and the attachment device can be coupled to the second side of the frame. In a more detailed example, the frame can be a monolithic structure, and the anchor can include at least one slot formed in the monolithic structure. The tether can be a strap disposed through the at least one slot. The frame can also include a recess configured to receive the attachment device. Optionally, the frame can be molded plastic.

In a more detailed example securing device, the frame includes a circular base and a cylindrical wall extending from a circumferential edge of the circular base. The cylindrical wall and a first surface of the circular base define a receiving space configured to receive the attachment device. The attachment device includes a ferrous shell and an annular magnet. The ferrous shell has a circular base and a cylindrical wall extending from a circumferential edge of the circular base. A first surface of the circular base and the cylindrical wall of the ferrous shell define a receiving space configured to receive the annular magnet therein. The anchor includes a raised bridge structure extending from a second side of the circular base of the frame opposite the first side.

The annular magnet is fixed within the receiving space of the ferrous shell, and the attachment device is fixed within the receiving space of the frame.

The example securing device can additionally include a cover including a circular base and a cylindrical wall. The cylindrical wall extends from a circumferential edge of the circular base of the cover. Together, the cylindrical wall of the cover and a first surface of the circular base of the cover define a receiving space, which is configured to closely receive the attachment device therein. The cover includes a contact surface opposite the first surface of the circular base, and the contact surface is disposed to abut the planar surface when the attachment device magnetically engages the planar surface through the cover. A circumference of the cylindrical wall of the cover is smaller than a circumference of the cylindrical wall of the frame, and the circumference of the cylindrical wall of the cover is larger than a circumference of the cylindrical wall of the ferrous shell. The different circumferences of the cylindrical walls allow the cylindrical wall of the cover to be disposed between the cylindrical wall of the ferrous shell and the cylindrical wall of the frame, when the cover, the frame, and the attachment device are coupled together. In addition, the attachment device is disposed between the circular base of the of the frame and the circular base of the cover, when the cover, the frame, and the attachment device are coupled together.

Optionally, the attachment device can include a suction cup instead of, or selectively interchangeable with, the first magnet. For example, the attachment device can include a suction cup. The magnet can be selectively removable from the frame, and the suction cup can be configured to be selectively attached to the frame when the magnet is removed from the frame. The magnet can also be configured to be selectively reattached to the frame when the suction cup is removed from the frame.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a securement device (e.g., a tie down) configured to be attached to planar surfaces. In the following description, numerous specific details are set forth (e.g., magnet shape, buckle type, etc.) in order to provide a thorough understanding of the invention. Those skilled in the art will recognize, however, that the invention may be practiced apart from these specific details. In other instances, details of well-known manufacturing practices (e.g., molding, material weaving, etc.) and components have been omitted, so as not to unnecessarily obscure the present invention.

Figure 1:
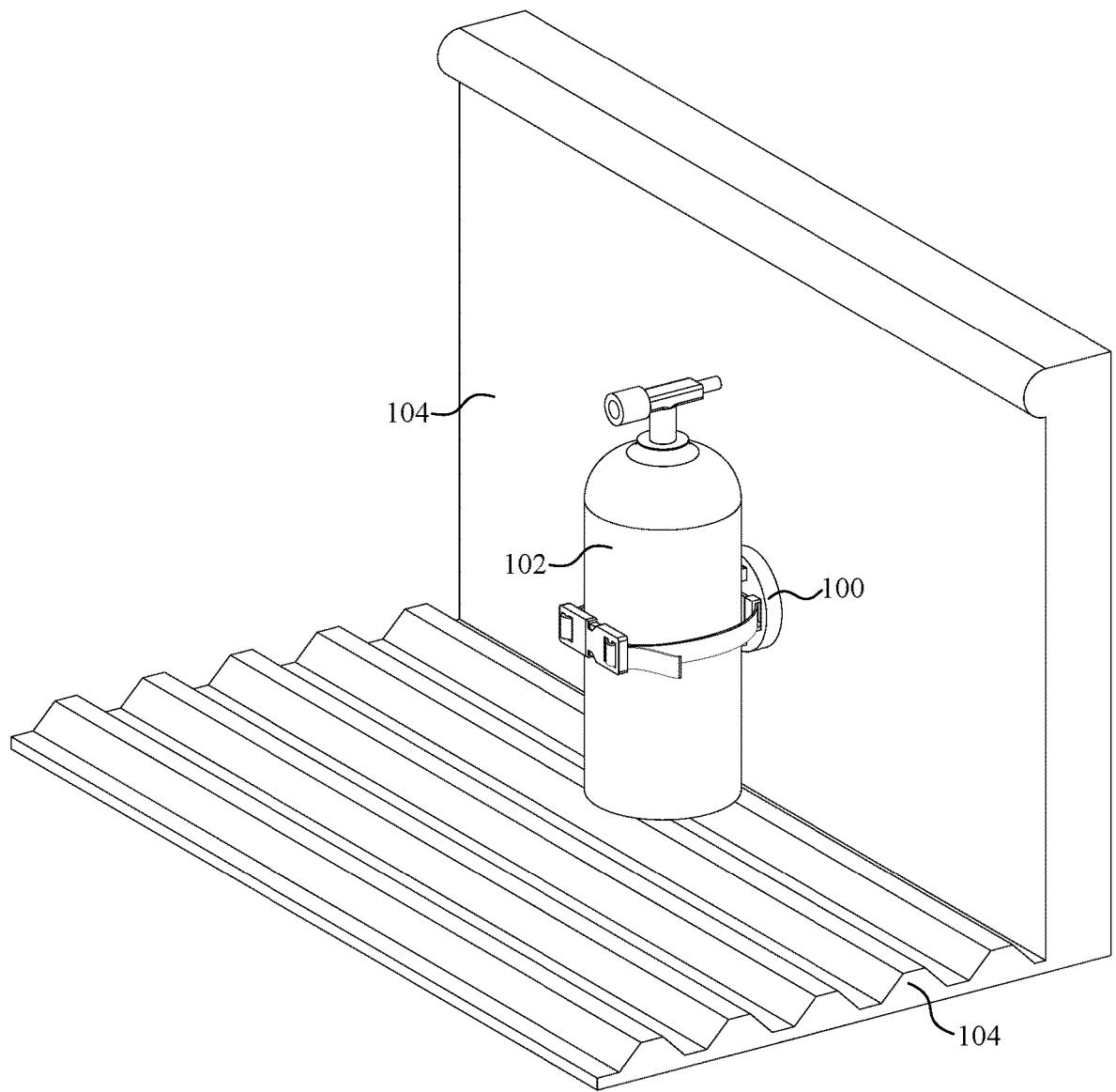
FIG. 1 is a perspective view of cargo being secured to a flat surface by a cargo securing device.

FIG. 1 is a perspective view of a securing device 100 securing an object to a planar surface. In this example, the object being secured by device 100 is a pressurized gas bottle 102, and the planar surface to which it is secured is a wall of a truck bed 104. Device 100 is shown attached directly to the planar interior wall of truck bed 104, which includes a ferrous material, via a magnet (shown in FIG. 2), but may optionally be secured thereto via a suction cup (shown in FIG. 9).

Figure 2:
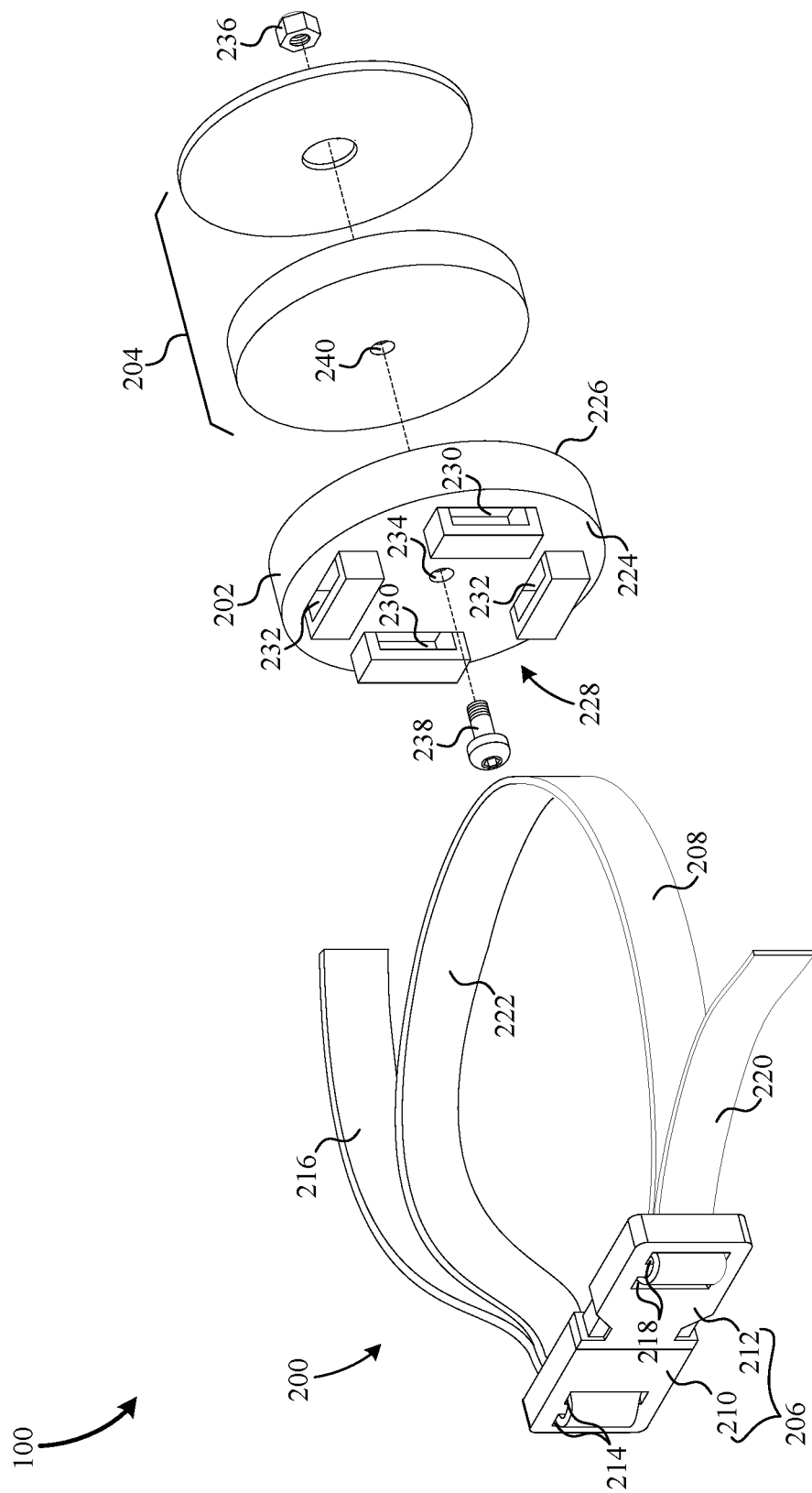
FIG. 2 is a partially exploded, perspective view of the cargo securing device of FIG. 1, including a magnetic attachment device.

FIG. 2 shows a perspective view of device 100 disassembled. Device 100 includes a tether 200, a frame 202, and an attachment device 204, which, in this example, is a magnetic device. When assembled, tether 200 is attached to a first side of frame 202 and attachment device 204 is attached to, or housed within, an opposite second side of frame 202.

Tether 200 is configured to secure objects such as, for example, cargo to frame 202. In this example, tether 200 includes a buckle 206 adjustably attached to a nylon strap 208. Buckle 206 provides two primary functions. First, buckle 206 allows strap 208 to be quickly attached and detached from objects. Second, buckle 206 allows strap 208 to be cinched tightly around objects of varying geometries and/or dimensions. Buckle 206 includes a male portion 210 that selectively engages a complementary female portion 212. Portion 210 includes a set of slots 214, through which a first end 216 of strap 208 is adjustably disposed. Likewise, portion 212 includes a set of slots 218, through which a second end 220 of strap 208 is adjustably disposed. By pulling ends 216 and/or 220, the intermediate region 222 of strap 208, which forms a loop, is shortened, thereby tightening tether 200 around an object. The configuration of slots 214 and 218 ensures that force imparted on strap 208 by an object secured therein will not loosen strap 208 with respect to buckle 206. To loosen strap 208 from an object, the user may urge one or both of open ends 216 and 220 back through the respective set of slots 214 and 218. Optionally, separating portions 210 and 212 of buckle 206 from one another will release strap 208 from the object to which it is secured. By separating portions 210 and 212 first, the adjustable length of intermediate region 222, or otherwise working length of strap 208, can be more easily adjusted.

Frame 202 is configured to be coupled between tether 200 and attachment device 204. Specifically, frame 202 includes a first side 224 and an opposite second side 226, which are configured to be coupled to tether 200 and attachment device 204, respectively. First side 224 includes an anchor 228 that facilitates the mounting of tether 200 to frame 202. In this embodiment, anchor 228 includes a first set of raised, slotted apertures 230 and a second set of raised, slotted apertures 232 (e.g., raised bridges). During assembly (or later during use), intermediate region 222 of strap 208 is disposed through both apertures 230. Accordingly, apertures 230 are aligned with one another to position strap 208 to extend in a first direction. Optionally, intermediate region 222 of strap 208 may be disposed through both of apertures 232, which are aligned with one another to position strap 208 in a second direction that is perpendicular to the aforementioned first direction. As another option, intermediate region 222 of strap 208 may be disposed through both apertures 230 while a second tether is disposed through both apertures 232. As yet another option, four tethers may be simultaneously coupled to frame 202 by disposing a tether through each respective one of the four apertures 230 and 232. Frame 202 further includes an aperture 234 that facilitates the mounting of attachment device 204 to second side 226 of frame 202.

In this particular example, frame 202 is a monolithic structure formed from molded plastic. However, those skilled in the art will recognize that frame 202 may have alternate geometric features and/or may be formed from alternate materials. For example, frame 202 may be formed from a metal blank that is stamped into shape. As another option, the cylindrical wall of frame 202 may be made polygonal, instead of cylindrical. As the number of polygonal sides increases, the shape of the polygonal wall will approach that of the cylindrical wall shown.

Attachment device 204 facilitates the attachment of device 100 to ferrous objects such as, for example, the interior of a steel truck bed, steel trailer structures, I-beams, steel plates, and so on. Attachment device 204 is removably attached to side 226 of frame 202 with a lock-nut 236 and a bolt 238. More specifically, when device 100 is assembled, bolt 238 is simultaneously disposed through an aperture 240 of attachment device 204 and aperture 234 of frame 202, and lock-nut 236 is tightened onto bolt 238.

Figure 3:
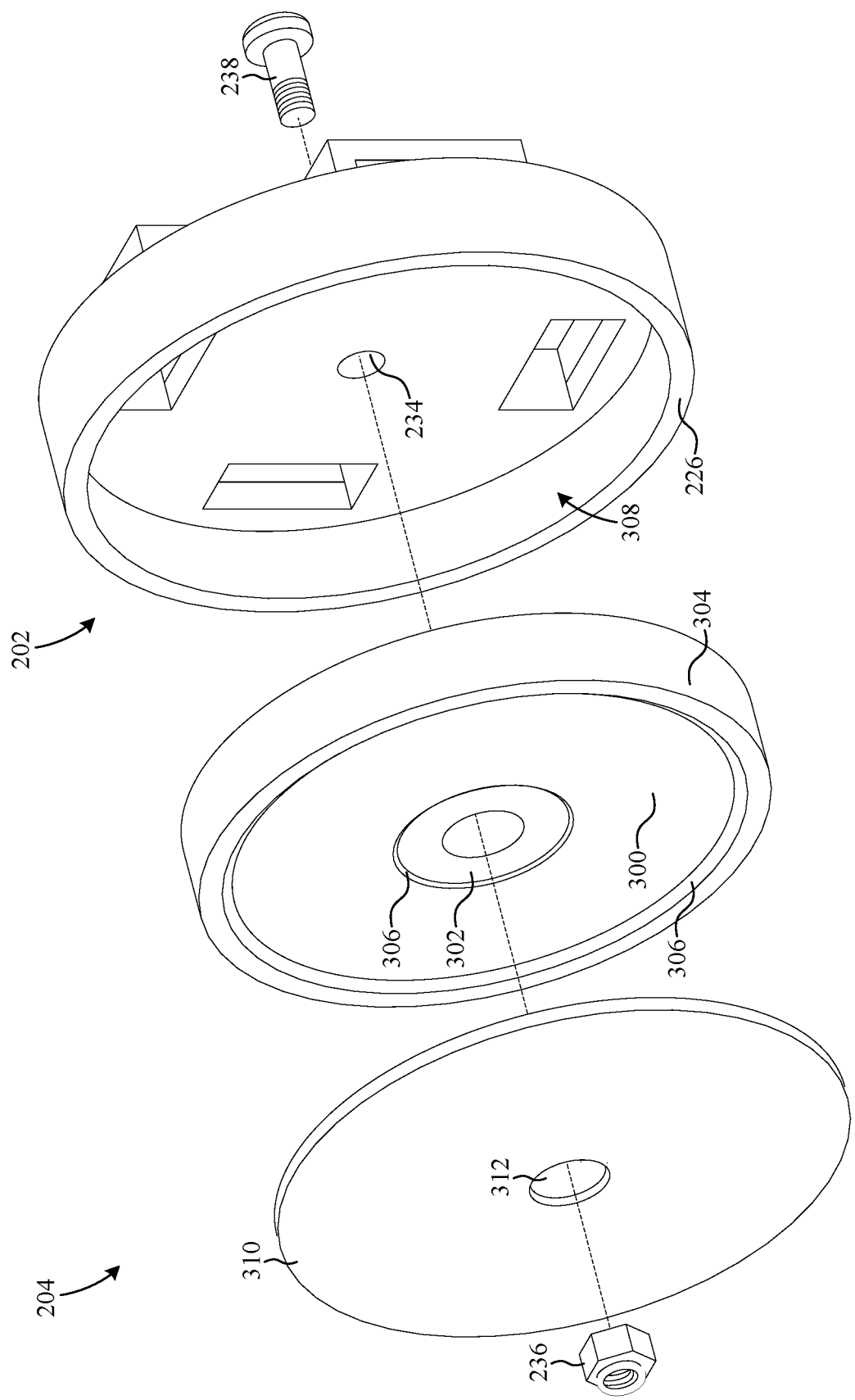
FIG. 3 is a partially exploded, perspective view of the magnetic attachment device and frame of FIG. 1.

FIG. 3 is a front perspective view of attachment device 204, lock-nut 236, and bolt 238, which are shown exploded from frame 202. In this example embodiment, attachment device 204 is a pot magnet, including an annular core magnet 300 and an optional rare earth magnet 302 seated in a ferrous shell 304 and fixed therein with an adhesive 306. Magnet 300 provides the magnetic field that attaches/attracts attachment device 204 to ferrous objects. In this example, magnet 300 is ceramic magnet but may optionally be a ferrite magnet. Shell 304 protects magnet 300 and also increases the pulling force of attachment device 204 by altering (e.g. concentrating, redirecting, focusing, etc.) its magnetic field. Rare earth magnet 302 increases the pulling force of attachment device 204 to further prevent attachment device 204 from inadvertently detaching from the ferrous object to which it is attached during use. Rare earth magnet 302 also helps to coaxially position magnet 300 with respect to aperture 240 of shell 304. Rare earth magnet 302 is also fixed to magnet 300 via adhesive 306. When assembled with frame 202, attachment device 204 is seated in a recess 308 formed on side 226 of frame 202 and fixed therein via lock-nut 236 and bolt 238.

Optionally, attachment device 204 includes a magnet cover 310 that prevents attachment device 204 from scratching the surface of an object to which device 100 is magnetically attached. Cover 310 is a plastic disk having an aperture 312 passing therethrough. Aperture 312 allows lock-nut 236 to pass through cover 310 during the assembly (or future disassembly) of device 100. To prevent scratching, the plastic of cover 310 is softer than magnet 300, but rigid enough to prevent curling and bunching if attachment device is slid along the surface to which it is magnetically attached.

Because different practical applications require different strength of attachment and/or ease of removal, attachment device 204 is not limited to any single magnet configuration. For example, in some applications that do not require maximum pulling force, attachment device 204 includes only a single ceramic or ferrite magnet 300, without an additional magnet. In this single magnet configuration, attachment device 204 provides approximately 115 lbs. of pulling force. In applications where moderate pulling force is required, attachment device 204 additionally includes rare earth magnet 302, which together with the main core magnet 300 (e.g., ceramic, ferrite, etc.), provides approximately 165 lbs. of pulling force. Rare earth magnet 302 provides about an additional 50 lbs. of pulling force. For applications that require even more pulling force, the main core magnet 300 may be substituted with an equal size and shape rare earth magnet, which provides an approximate pulling force of 190 lbs.

Figure 4:
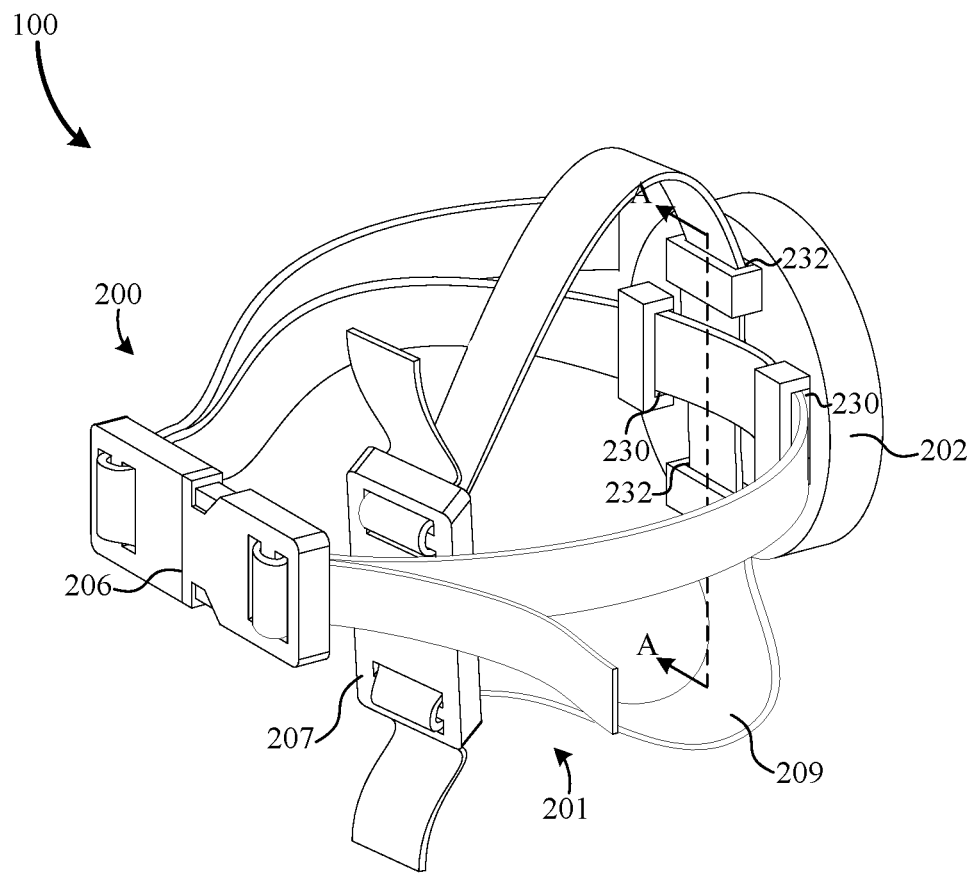
FIG. 4 is a rear perspective view of the cargo securing device of FIG. 1 assembled.

FIG. 4 is a perspective view of a first tether 200 shown assembled with a first strap 208 disposed through apertures 230, and a second tether 201 shown assembled with a second strap 209 disposed through apertures 232. Although tethers 200 and 201 are coupled to frame 202 when straps 208 and 209 are disposed through apertures 230 and 232 respectively, straps 208 and 209 are still free to move within respective apertures 230 and 232. As a result, straps 208 and 209 do not get worn over long-term use as compared to securing devices that have straps screwed directly to an attachment device. As another advantage, the position of buckle 206 with respect to frame 202 and the position of buckle 207 of tether 201 with respect to frame 202 can be easily adjusted to accommodate different object securing scenarios.

Figure 5:
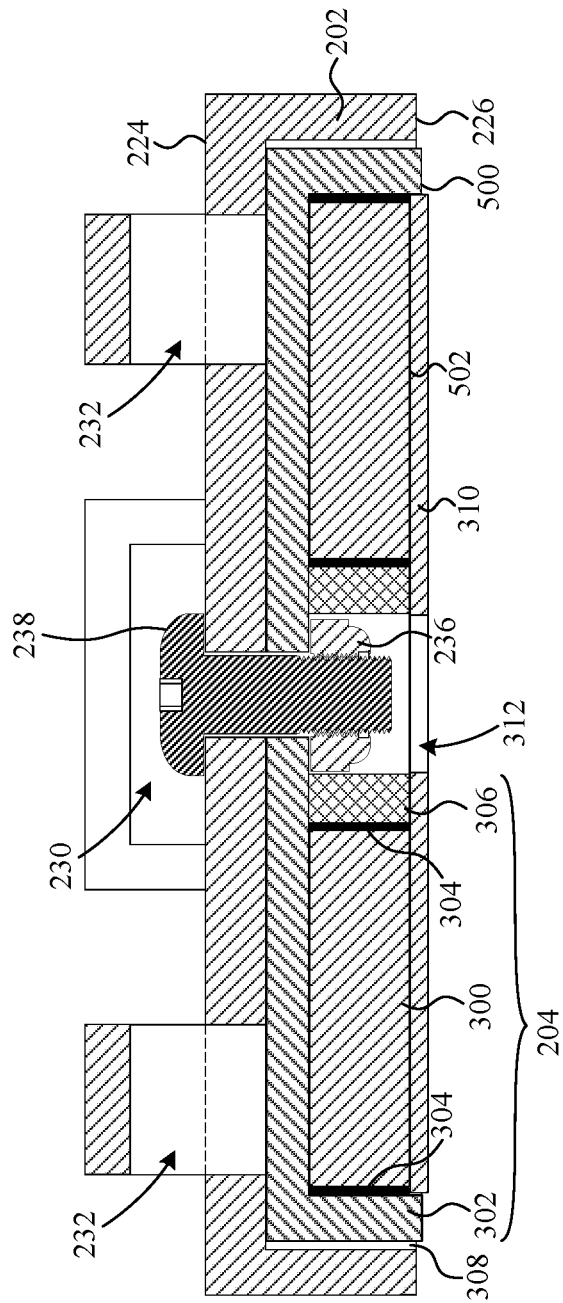
FIG. 5 is a cross-sectional view of a magnetic attachment device and frame of FIG. 1, taken along line A-A of FIG. 4.

FIG. 5 is a cross-sectional view of assembled frame 202, attachment device 204, lock-nut 236, and bolt 238, taken along Line A-A of FIG. 4. As shown, the depth of recess 308 is less than the height of shell 304. As a result, the bottom surface 500 of shell 304 protrudes slightly from side 226 of frame 202. This allows attachment device 204 to get closer to a ferrous surface for attachment and, therefore, provides increased pulling force to restrain cargo secured thereto.

As shown, the thickness of magnet cover 310 is greater than the distance between bottom surface 500 of shell 304 and the bottom surface 502 of magnet 300. This prevents bottom surface 500 of shell 304 from directly contacting and scratching the surface of the ferrous object to which device 100 is magnetically attached. Of course, cover 310 also prevents surface 502 of magnet 300 from directly contacting and scratching the surface of the ferrous object to which device 100 is magnetically attached. Cover 310 may be temporarily or permanently attached to surface 502 of magnet 300 by, for example, an adhesive. Accordingly, the backside of cover 310 may include an adhesive layer formed thereon. As another option, cover 310 can be enlarged slightly to also cover surface 500 of shell 304.

Figure 6:
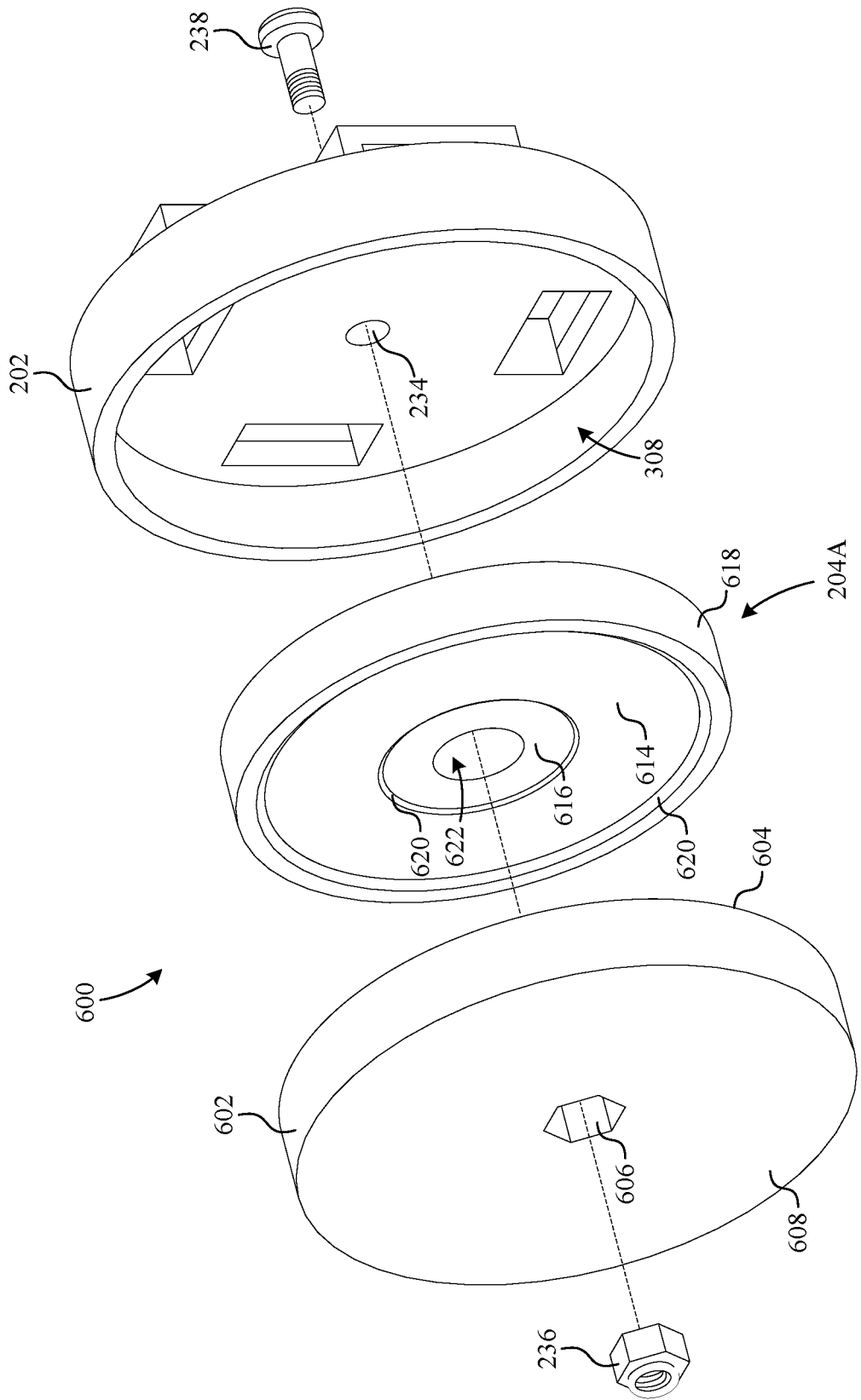
FIG. 6 is a partially exploded, front perspective view of a portion of an alternate securing device.

FIG. 6 is a partially exploded, front perspective view of an alternate magnetic securing device 600, which includes an alternate magnet cover 602, lock-nut 236, bolt 238, an alternate magnetic attachment device 204A, and frame 202. During assembly, device 600 is seated in the rear side 604 (shown in FIG. 7) of cover 602, and lock-nut 236 is seated in a hexagonal recess 606 formed on the opposite front side 608 of cover 602. Then, cover 602, having magnetic attachment device 204A seated therein, is seated in recess 308 of frame 202. Finally, bolt 238 is disposed through aperture 234 of frame 202, though aperture 610 (shown in FIG. 7) of magnetic attachment device 204A, through aperture 612

(shown in FIG. 7) of cover 602, and threaded into lock-nut 236. The hexagonal recess 606 prevents lock-nut 236 from rotating, as bolt 238 is threaded into lock-nut 236. Accordingly, bolt 238 can be threaded into lock-nut 236 with a single tool (e.g. hex wrench).

Alternate magnetic attachment device 204A is substantially similar to attachment device 204, except that the outer diameter of device 204A is slightly less than that of attachment device 204. This allows a portion (the cylindrical wall) of cover 602 to be disposed between the outer surface of attachment device 204 and the inner surface of frame 202. Magnetic attachment device 204A includes an annular core magnet 614 and an optional rare earth magnet 616 coaxially aligned with one another and seated in a ferrous shell 618. Magnet 614 and magnet 616 are fixed in shell 618 with an adhesive 620. Magnet 616 is also annular and defines an interior space 622 that seats a portion of cover 602, as is shown in more detail in FIGS. 7-8.

Magnet cover 602 prevents attachment device 204A from scratching ferrous objects to which magnetic securing device 600 is attached. For example, when securing device 600 is magnetically attached to the interior painted surface of a truck bed, magnet cover 602 prevents magnetic attachment device 204A from scratching it, because cover 602 is softer than the painted finish. Frame 202 and magnetic device 204A can optionally be assembled without cover 602 to achieve a greater pulling force from magnetic device 600, in applications where scratching is not a concern. In this example embodiment, cover 602 is a monolithic structure formed, for example, by injection molding a rigid, low-friction plastic. The plastic material used to form cover 602 is softer than magnetic device 600 and, therefore, reduces the possibility of scratching.

Figure 7:
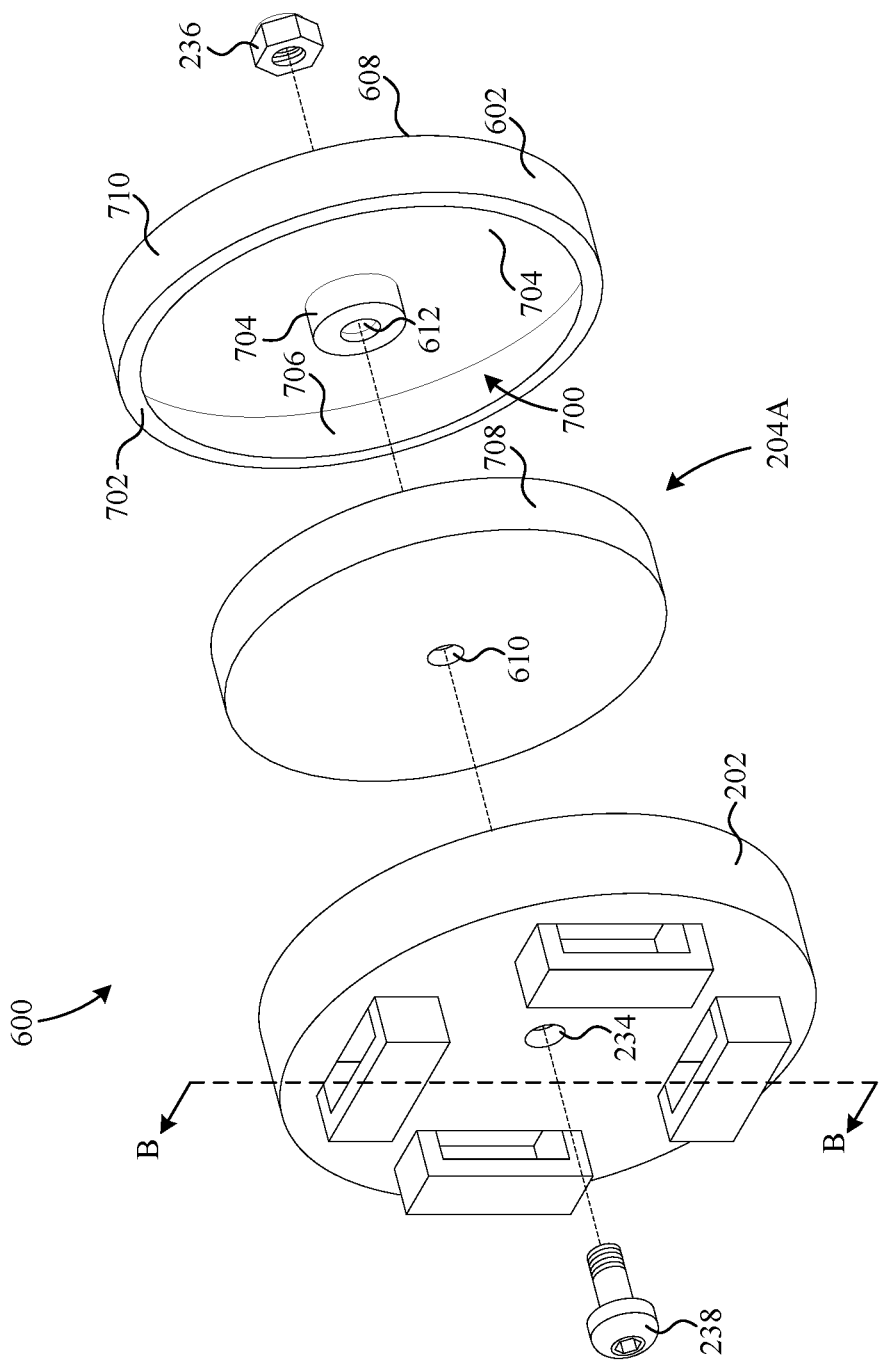
FIG. 7 is a partially exploded, rear perspective view of the frame, the magnet cover, and the magnetic device of FIG. 6, partially exploded.

FIG. 7 is a rear perspective view of magnetic device 204A, magnet cover 602, lock-nut 236, and bolt 238, shown exploded from frame 202. As shown, the rear side of magnet cover 602 defines a recess 700, which is configured to seat magnetic device 204A therein. Recess 700 is defined by an outer cylindrical wall 702 and an inner cylindrical wall 704. Outer cylindrical wall 702 extends from the circumferential (peripheral) edge of circular cover 602. Further, the interior surface 706 of outer wall 702 is configured to closely receive the round, outer peripheral surface 708 of magnetic device 204A, while the exterior surface 710 of outer wall 702 is configured to closely seat within the interior surface of frame 202. Inner wall 704 is disposed in the center of recess 700 and is configured to be inserted into space 622 of magnet 616 (FIG. 6).

Figure 8:
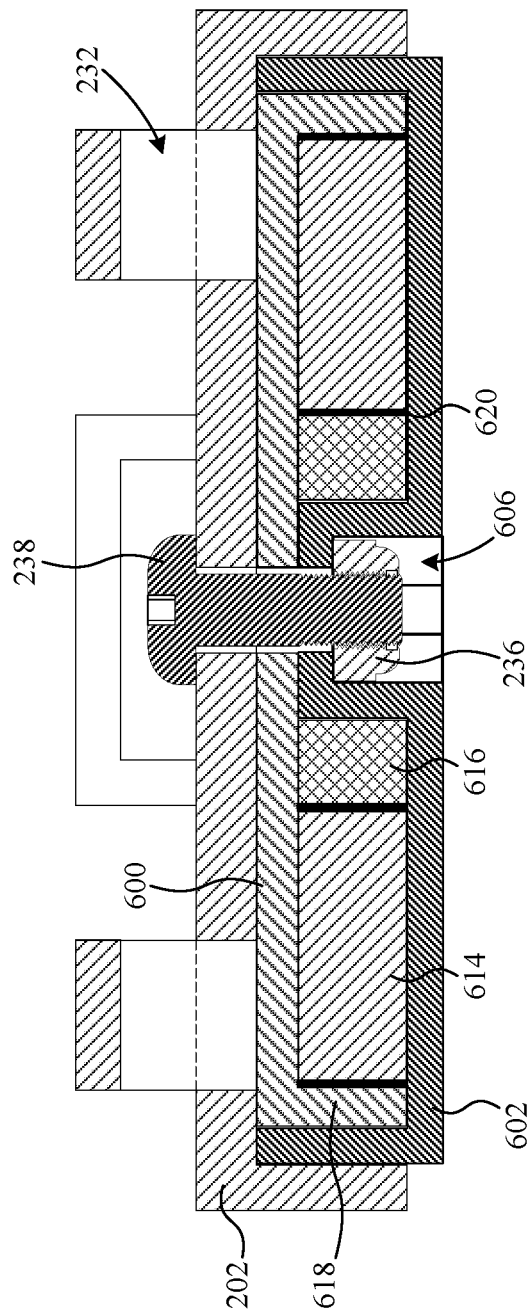
FIG. 8 is a cross-sectional view of the frame, the magnet cover, and the magnet device of FIG. 6, taken along line B-B of FIG. 7 (when assembled)

FIG. 8 is a cross-sectional view of bolt 238, frame 202, magnetic device 204A, magnet cover 602, and lock-nut 236 taken along line B-B of FIG. 7, after assembly. When assembled, magnet device 204A is seated in recess 700 (shown in FIG. 7) of cover 602, while cover 602 is seated in recess 308 (shown in FIG. 6) of frame 202, such that magnet device 204A is enclosed between frame 202 and magnet cover 602. Further, frame 202 and magnet cover 602 are fixed together with bolt 238 and lock-nut 236. In the drawings, the thickness of cover 602 is exaggerated for illustrative purposes. Although cover 602 is not limited to a particular thickness, the inventor has achieved good results when the thickness of cover 602 is approximately 1.0 mm.

Figure 9:
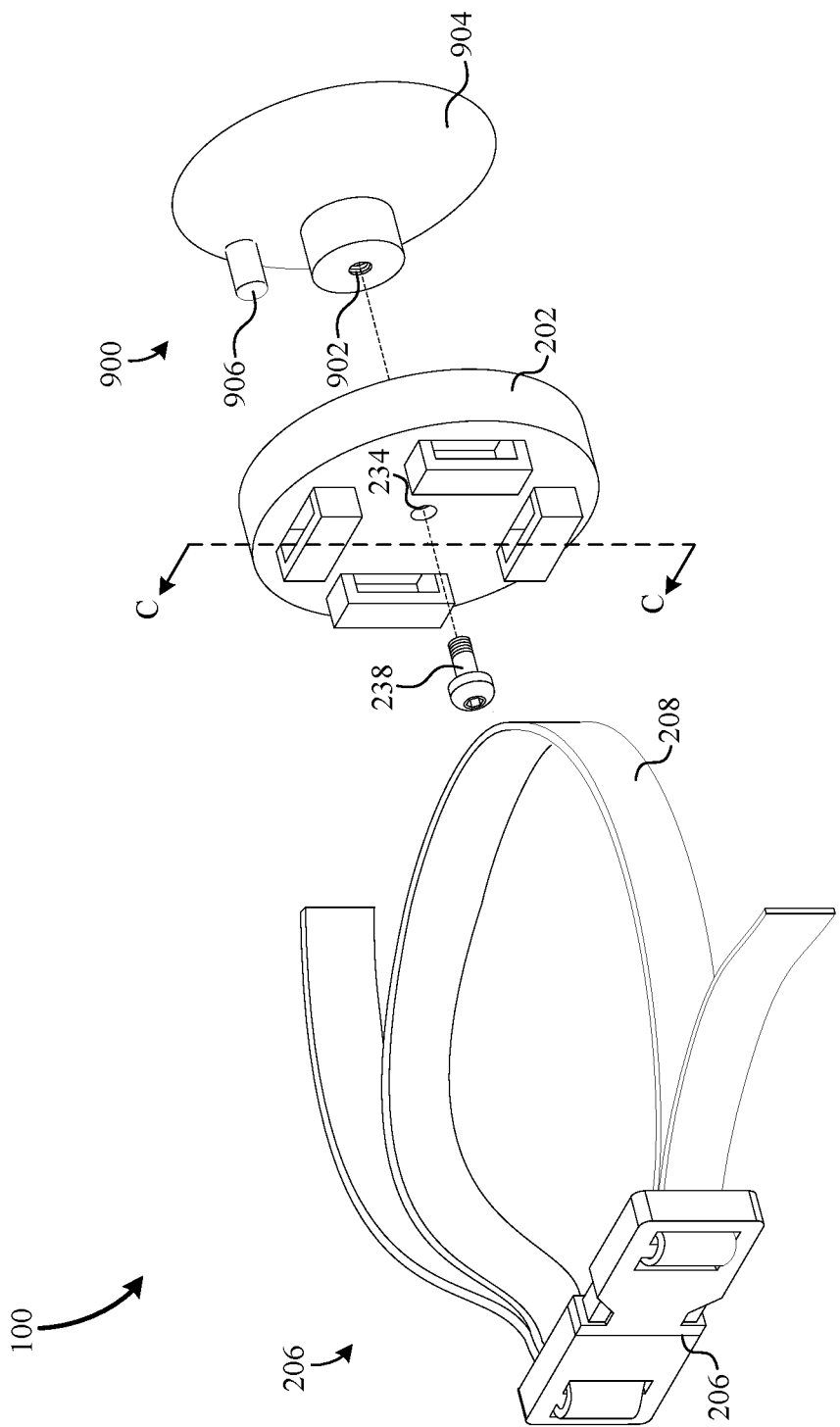
FIG. 9 is an exploded, rear perspective view of the cargo securing device of FIG. 1 including an optional suction cup attachment device.

FIG. 9 shows an exploded perspective view of device 100, wherein a suction cup 900 is substituted for magnetic attachment device 204 and lock-nut 236. Suction cup 900 facilitates the mounting of device 100 to a flat surface. Suction cup 900 includes a female threaded aperture 902 that facilitates the mounting of suction cup 900 to frame 202. During the attachment of suction cup 900 to frame 202, bolt 238 is disposed through aperture 234 of frame 202 and then the male threads of bolt 238 are threaded into a complimentary set of female threads of threaded aperture 902. Optionally, a metal anchor can be molded into suction cup 900 to provide a stronger base for the female threads. When assembled, frame 202 is disposed between the head of bolt 338 and suction cup 900 while the head of bolt 238 is disposed between frame 202 and strap 208. Suction cup 900 further includes a suction body 904 that provides the suction force used to attach suction cup 900 to a flat surface. Body 904 includes a nipple 906 that facilitates the removal of suction cup 900 from a flat surface.

Figure 10:
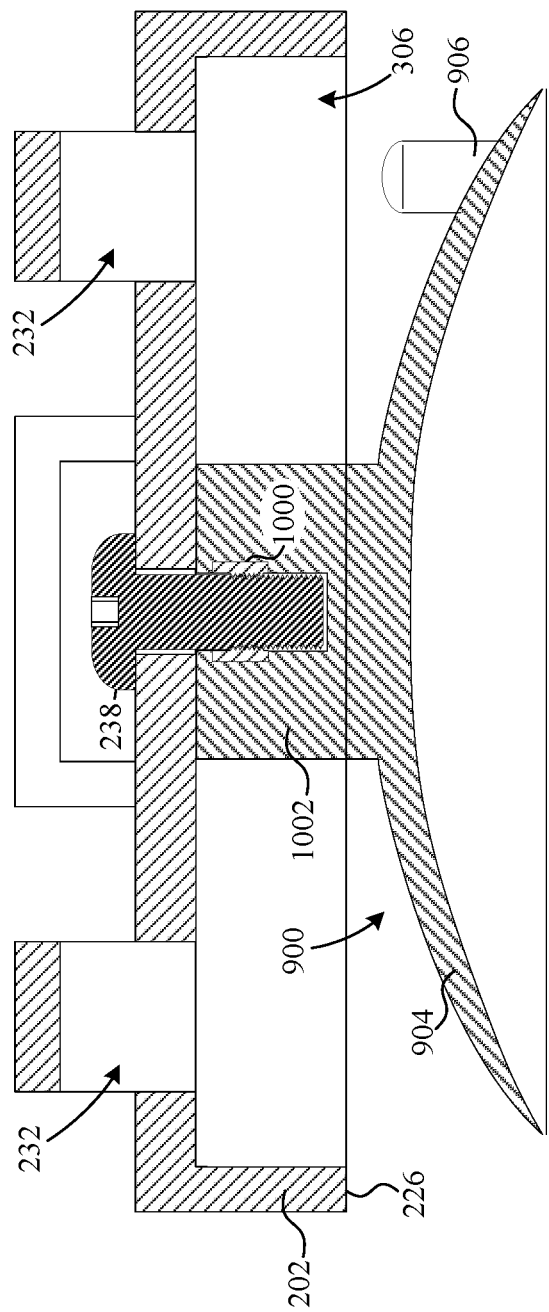
FIG. 10 is a cross-sectional side view of the frame and the suction cup of FIG. 9 (assembled), taken along line C-C of FIG. 9.

FIG. 10 is a cross-sectional view of assembled frame 202, bolt 238, and suction cup 900, taken along Line C-C of FIG. 9. Suction cup 900 is a resilient body formed, for example, from a rubberized material (e.g., rubber, silicone, etc.) formed around a rigid threaded insert 1000. Although not shown, rigid threaded insert 1000 can include wings or other structures that extend outwardly, further into a standoff portion 1002 of suction cup 900. When device 100 is assembled with suction cup 900, suction body 904 is positioned completely out of recess 308 to allow the user to access suction body 904 when suction cup 900 is attached to a flat surface and to allow the compression of suction cup 900 toward the flat surface. For example, standoff portion 1002 spaces suction body 904 away from frame 202. In this particular example, the height of standoff portion 1002 is greater than the depth of recess 308.

Figure 11:
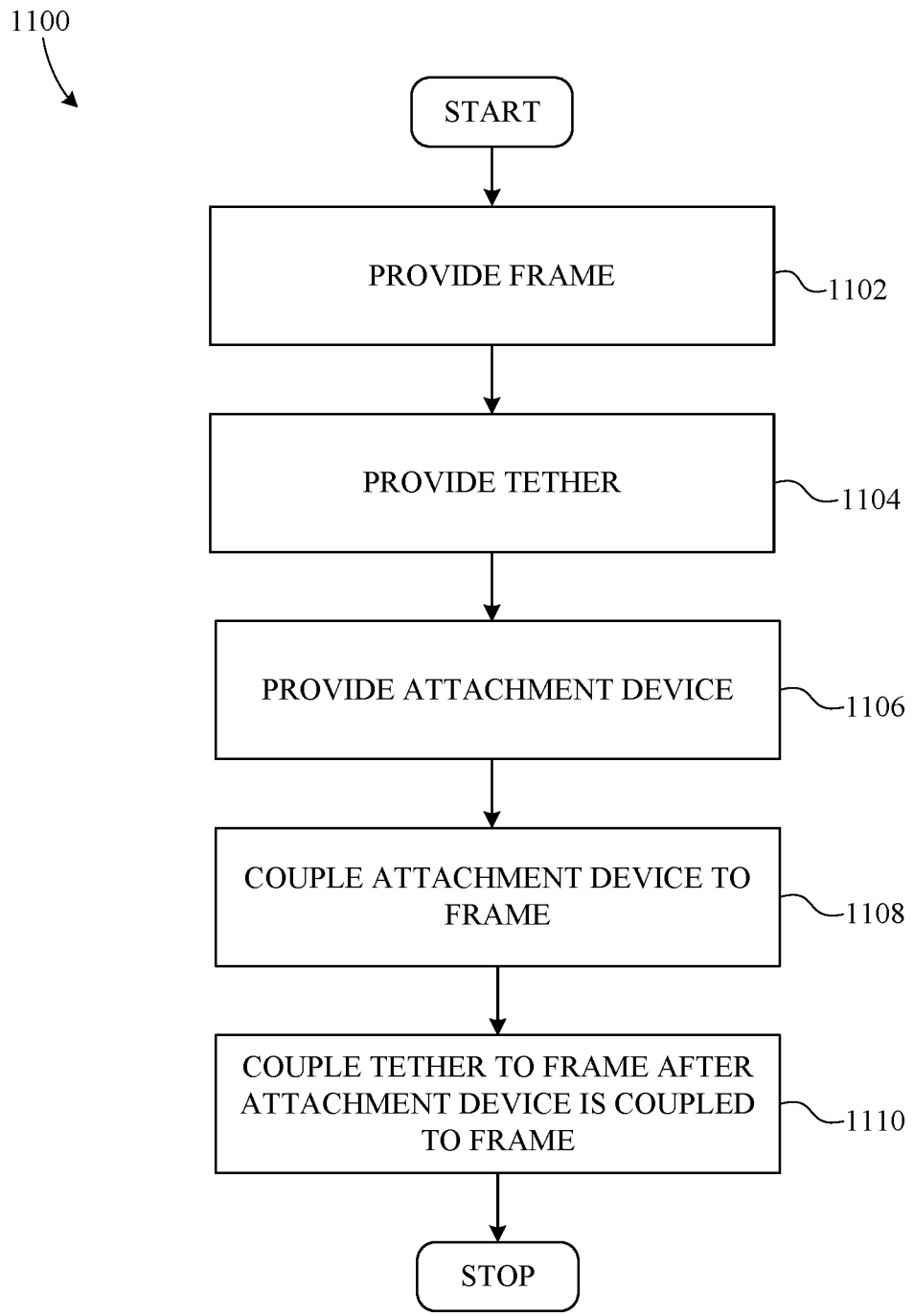
FIG. 11 is a flowchart summarizing a method of manufacturing a cargo securing device.

FIG. 11 is a flowchart summarizing a method 1100 of manufacturing a cargo securing device. In a first step 1102, a frame is provided. Then, in a second step 1104, a tether is provided. Next, in a third step 1106, an attachment device is provided. Then, in a fourth step 1108, the attachment device is coupled to the frame. Finally, in a fifth step 1110, the tether is coupled to the frame, after the attachment device is coupled to the frame.

The description of particular embodiments of the present invention is now complete. Many of the described features may be substituted, altered or omitted without departing from the scope of the invention. For example, alternate tethers (e.g., ratchet strap, bungee cords, cinch straps, etc.), may be substituted for the buck and strap. As another example, the cargo securing device may include multiple magnets and/or different combinations of magnets to facilitate the selective attachment to a ferrous surface. These and other deviations from the particular embodiments shown will be apparent to those skilled in the art, particularly in view of the foregoing disclosure.

I claim:
1. A securing device comprising:
   a first magnet configured to be removably attached to a planar surface;
   a monolithic frame including a wall having a first side and an opposite second side, said first magnet being attached to said monolithic frame on said first side of said wall, said frame defining an integral anchor extending away from said second side of said wall of said monolithic frame in a direction away from said first side of said wall of said monolithic frame;
   a first tether coupled to said anchor of said monolithic frame, said first tether being configured to removably attach an object to said monolithic frame; and wherein
   said anchor includes at least a first bridge extending from said second side of said wall of said frame, said first bridge defining a first tether passage thereunder;

said first tether is disposed through said first tether passage; and
said first tether passage is positioned to guide said first tether in a first direction.

2. The securing device of claim 1, wherein:
said securing device includes a second tether configured to removably attach said object to said monolithic frame;
said anchor includes at least a second bridge extending from said second side of said wall of said frame, said second bridge defining a second tether passage thereunder;
said second tether is disposed through said second tether passage; and
said second tether passage is positioned to guide said tether in a second direction.

3. The securing device of claim 2, wherein:
said anchor includes a third bridge defining a third tether passage thereunder;
said third tether passage is aligned with said first tether passage;
said first tether is disposed through said first tether passage and said third tether passage;
said anchor includes a fourth bridge defining a fourth tether passage thereunder;
said fourth tether passage is aligned with said second tether passage; and
said second tether is disposed through said second tether passage and said fourth tether passage.

4. The securing device of claim 2, wherein said first direction is perpendicular to said second direction.

5. The securing device of claim 1, wherein:
said first tether includes a first portion, a second portion, and an intermediate portion disposed between said first portion and said second portion;
said intermediate portion of said first tether is coupled to said anchor;
said first tether includes a coupler configured to removably attach said first portion of said first tether to said second portion of said first tether.

6. The securing device of claim 5, wherein:
said first tether is a strap;
said coupler is a buckle having a first portion attached to said first portion of said first tether and a complimentary second portion attached to said second portion of said first tether;
the position of said first portion of said coupler along said first portion of said first tether is adjustable.

7. The securing device of claim 1, wherein said first tether is movable with respect to said anchor of said frame when said first tether is coupled to said anchor of said frame.

8. The securing device of claim 1, wherein said first tether passage extends in a direction that is parallel to said planar surface.

9. The securing device of claim 1, wherein said monolithic frame is molded plastic.

10. The securing device of claim 1, wherein said frame includes a recess configured to receive said first magnet.

11. The securing device of claim 1, wherein:
said wall of said frame is a circular base and includes a cylindrical wall extending from a circumferential edge of said circular base in a direction away from said second side of said wall of said frame, said cylindrical wall and a first surface of said circular base defining a receiving space configured to receive said first magnet;
said first magnet includes a ferrous shell and is annular, said ferrous shell having a circular base and a cylindrical wall extending from a circumferential edge of said circular base, a first surface of said circular base of said ferrous shell and said cylindrical wall of said ferrous shell defining a receiving space configured to receive said first magnet therein;
said anchor includes a raised bridge extending from said second side of said wall;
said first magnet is fixed within said receiving space of said ferrous shell; and
said ferrous shell is removably fixed within said receiving space of said frame.

12. The securing device of claim 11, further comprising:
a cover including a circular base and a cylindrical wall extending from a circumferential edge of said circular base, said cylindrical wall and a first surface of said circular base of said cover defining a receiving space configured to closely receive said first magnet therein, said cover including a contact surface opposite said first surface of said circular base, said contact surface disposed to abut said planar surface when said first magnet magnetically engages said planar surface through said cover; and wherein
a circumference of said cylindrical wall of said cover is smaller than a circumference of said cylindrical wall of said frame;
said circumference of said cylindrical wall of said cover is larger than a circumference of said cylindrical wall of said ferrous shell;
said cylindrical wall of said cover is disposed between said cylindrical wall of said ferrous shell and said cylindrical wall of said frame, when said cover, said frame, and said first magnet are coupled together; and
said first magnet is disposed between said circular base of said of said frame and said circular base of said cover, when said cover, said frame, and said first magnet are coupled together.

13. A securing device comprising:
a first magnet configured to be removably attached to a planar surface;
a monolithic frame including a wall having a first side and an opposite second side, said first magnet being attached to said monolithic frame on said first side of said wall, said frame defining an integral anchor extending away from said second side of said wall of said monolithic frame in a direction away from said first side of said wall of said monolithic frame;
a first tether coupled to said anchor of said monolithic frame, said first tether being configured to removably attach an object to said monolithic frame; and wherein
said first magnet is selectively removable from said first side of said wall of said frame.

14. The securing device of claim 13, further comprising a suction cup configured to be selectively attached to said frame when said first magnet is removed from said frame; and wherein
said first magnet is configured to be selectively reattached to said frame when said suction cup is removed from said frame.

15. The securing device of claim 13, wherein said first magnet further includes a ferrous shell configured to increase the pulling force of said first magnet.

16. The securing device of claim 13, further including a second magnet.

17. The securing device of claim 16, wherein
said first magnet is annular and defines an interior space, and said second magnet is disposed in said interior space of said first magnet.

18. The securing device of claim 13, further comprising a cover disposed over said first magnet to prevent said first magnet from scratching said planar surface to which said securing device is to be magnetically attached, said cover being formed out of a material that is softer than said first magnet.

19. The securing device of claim 18, wherein:
said cover includes a first side configured to abut said planar surface;
said cover includes a second side opposite said first side, said second side defining a recess configured to receive said first magnet; and
said first magnet is disposed between said frame and said cover.

20. The securing device of claim 19, wherein at least a portion of said cover is disposed between said first magnet and said frame.

21. A securing device comprising:
a first magnet configured to be removably attached to a planar surface;
a monolithic frame including a wall having a first side and an opposite second side, said first magnet being attached to said monolithic frame on said first side of said wall, said frame defining an integral anchor extending away from said second side of said wall of said monolithic frame in a direction away from said first side of said wall of said monolithic frame;
a first tether coupled to said anchor of said monolithic frame, said first tether being configured to removably attach an object to said monolithic frame; and wherein said anchor includes at least a first bridge extending from said second side of said wall of said frame, said first bridge defining a first tether passage thereunder;
said first tether is disposed through said first tether passage;
said first tether passage is positioned to guide said first tether in a first direction; and
said first magnet is selectively removable from said first side of said wall of said frame.

* * * * *